2,822,389

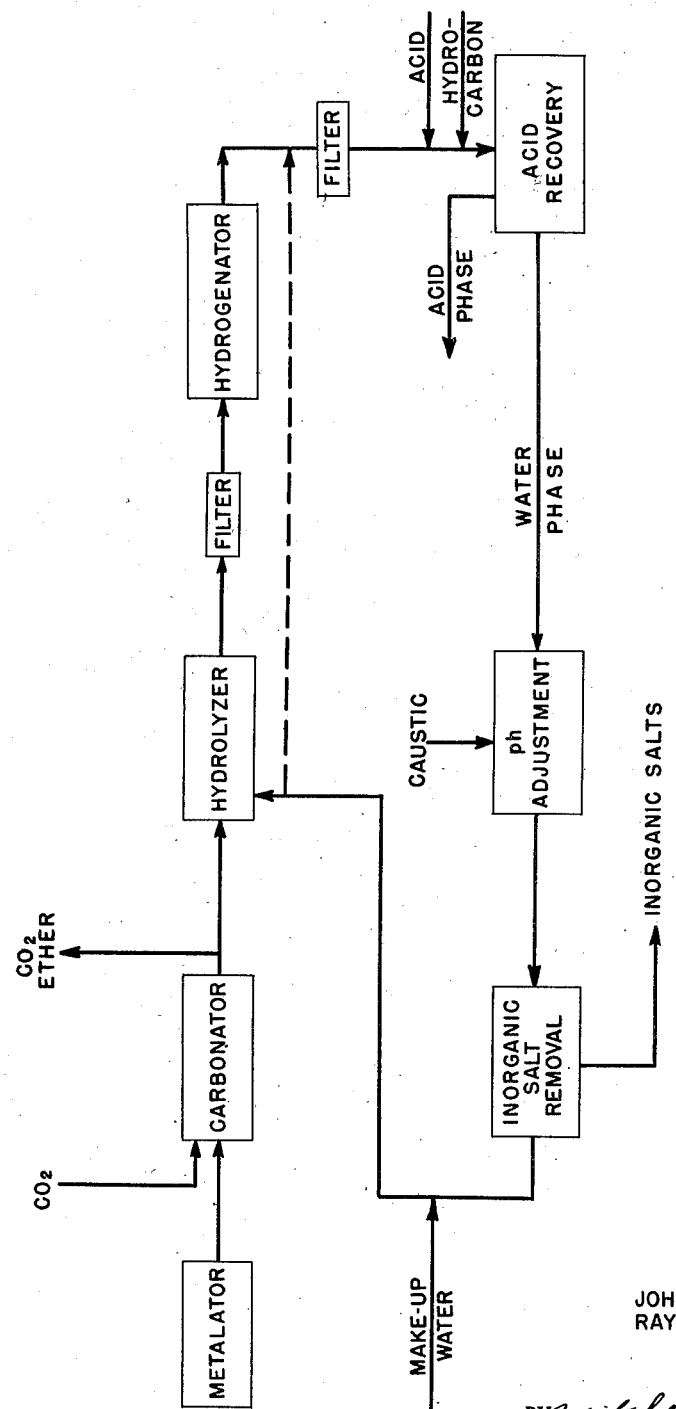
FIG. I

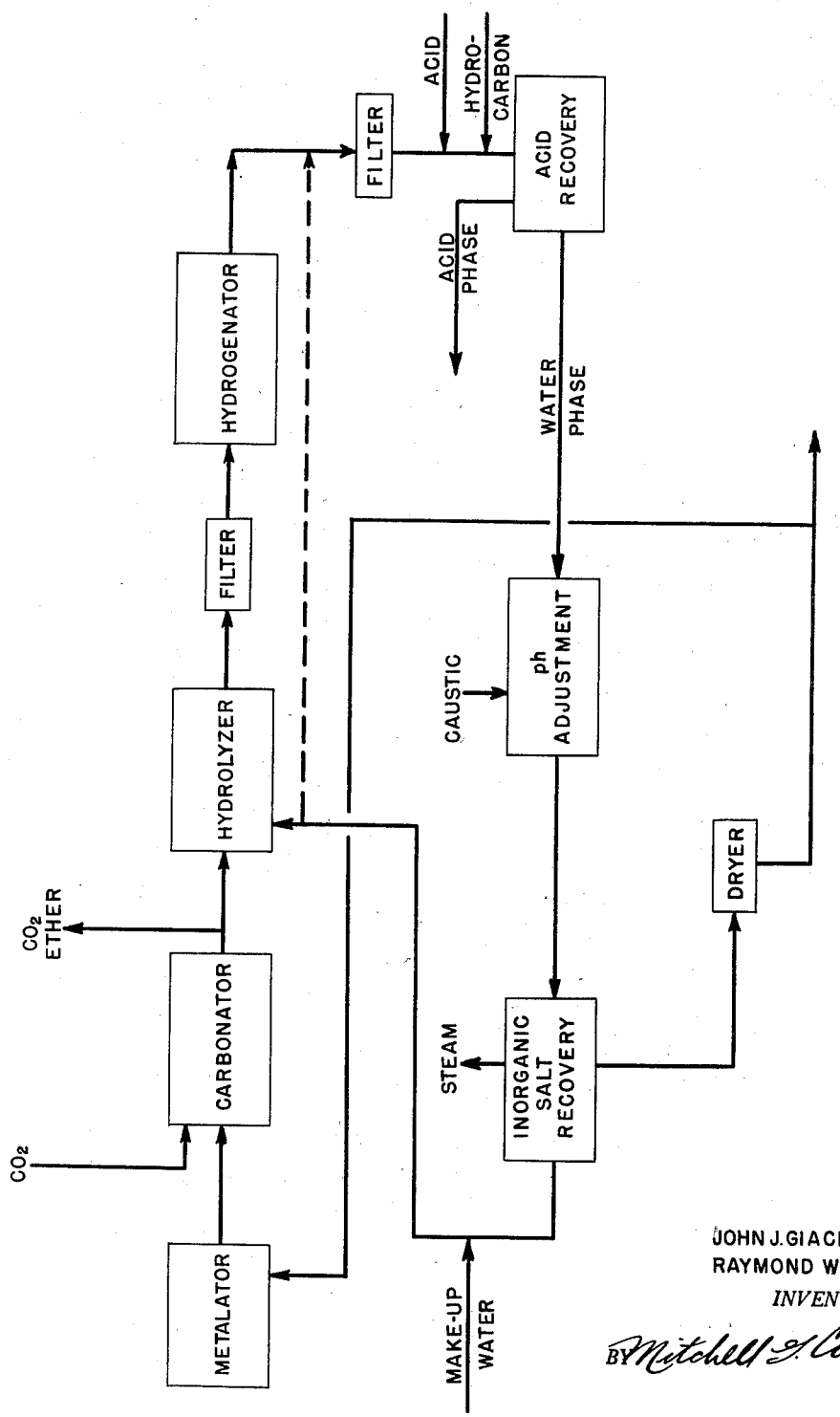

SEPARATION OF C$_{10}$ DICARBOXYLIC ACIDS

Raymond Wynkoop, Metuchen, N. J., and John J. Giachetto, La Romana, Dominican Republic, assignors to National Distillers and Chemical Corporation, New York, N. Y., a corporation of Virginia Application November 15, 1955, Serial No. 547,010

18 Claims. (Cl. 260—533)

The present invention relates to an improvement in processing of mixtures comprising carboxylic acids, as defined more fully hereinafter, for recovery of the carboxylic acids therefrom in improved manner and minimization of waste disposal problems normally attendant to their recovery. More particularly, the invention relates to a process for preparation of desired carboxylic acid mixtures, and, in which process, a treatment is utilized whereby improved recovery of desired acids and other materials used in their production are effected along with obtainment of other advantages including minimization of waste disposal problems normally attendant to recovery of the acids. Still more particularly, the process embodied herein relates to an improvement in a process wherein an olefinic material is reacted with a finely divided alkali metal under conditions to selectively form in high yields the dialkali metal derivatives of dimers of the olefinic material, conversion of such derivatives to salts of dicarboxylic acids, liberation of the free acids from said salts, and utilization in such a process of a treatment for recovery of the acids in a manner whereby loss of desired acids is obviated or substantially minimized and waste disposal problems normally attendant to recovery of the acids are obviated.

The treatment embodied herein which provides the improvements described more fully hereinafter may be utilized for treatment of mixtures of carboxylic acids prepared by a variety of methods. However, it is particularly applicable to carboxylic acid mixtures derived by carbonation of metal derivatives of olefinic materials and, particularly, carboxylic acid mixtures derived from initial reaction between an olefin and an alkali metal under metalation reaction conditions to selectively form in high yields the dialkali metal derivatives of dimers of the olefin. With respect thereto, the selective dimerization process may be carried out with olefinic materials such as conjugated dienes illustrated by butadiene, isoprene, 4-methyl-1,3-pentadiene, 2-methyl 1,3-pentadiene, and the like; vinyl aromatics such as styrene, alkyl substituted styrenes, and others. In preferred aspect, the treatment embodied herein is utilized in a process wherein a conjugated diene of from 4 to 8 carbon atoms is reacted with an alkali metal in finely dispersed form under metalation reaction conditions to provide a reaction mixture comprising dialkali metal derivatives of dimers of the diene followed by carbonation of the reaction mixture to produce a carbonated mixture comprising dialkali metal salts having two more carbon atoms per molecule than said dimer, liberation of the acids from their salts, and recovery of the acids in improved manner whereby losses of carboxylic acids are minimized and other advantages are obtained as will be apparent from the description of the invention set forth hereinafter.

For purposes of illustration, and as a particularly important application of this invention is its use in treatment of carboxylic acid mixtures derived from initial reaction between a conjugated diene and an alkali metal in finely dispersed form, the invention is described with emphasis on carboxylic acid mixtures prepared from a method as set forth hereinafter.

It has recently been found that an olefinic hydrocarbon material can be treated with a finely divided alkali metal in a selected ether medium and in the presence of a relatively small amount of a polycyclic aromatic hydrocarbon and/or a selected attrition agent at a temperature preferably below about 0° C. to produce a mixture comprising dimetallo derivatives of the dimerized olefin. For example, in the case of initial reaction between sodium and butadiene, the reaction product comprises a mixture of disodium derivatives of isomeric octadienes; and in use of other diolefins for the initial reaction, such as isoprene, methyl pentadienes, and the like, correspondingly similar reaction mixtures are obtained. In addition to the dimetallo derivatives of the dimers of the diolefin, relatively small amounts of alkali metal derivatives of the diolefin, monoalkali metal derivatives of the dimerized olefin as well as other alkali metal alkenes are formed during the initial reaction between the diolefin and the finely dispersed alkali metal. Thus, upon carbonation, the reaction mixture is converted to a mixture comprising salts of unsaturated dicarboxylic acids having two more carbon atoms per molecule than the dimerized diolefin and salts of unsaturated monocarboxylic acids. For example, in the use of butadiene and finely dispersed sodium for the initial reaction, there is produced, upon carbonation of the reaction mixture, a carbonated mixture comprising predominantly the disodio salts of isomeric C$_{10}$ unsaturated dicarboxylic acids, and a small amount of unsaturated monocarboxylic acids including C$_5$, C$_9$, C$_{13}$ and higher molecular weight monocarboxylic acids.

Such a mixture of unsaturated sodium salts may be subjected to neutralization in an aqueous medium whereby there is produced an organic phase comprising in solution the bulk of the resulting free unsaturated acids and an aqueous phase which normally contains a small amount of carboxylic acids and inorganic salts formed by the neutralization treatment. Such an aqueous phase is a suitable example of a carboxylic acid mixture suitable for use in practice of this invention. Preferably, however, the aqueous mixture comprising the salts of the unsaturated acids is subjected to hydrogenation, and the resulting aqueous mixture of the salts of the corresponding salts of the corresponding saturated acids is subjected to neutralization whereby there is produced an organic phase containing the bulk of the free carboxylic acids in solution and an aqueous phase comprising in solution the remainder of the free carboxylic acids and water soluble salts formed in the neutralization treatment. Such an aqueous mixture is also suitable for use in practice of this invention and, generally, such an aqueous mixture contains up to about 10% by weight of the total carboxylic acids liberated in the neutralization treatment. Preferably, however, the neutralization step is carried out in the presence of an aromatic hydrocarbon solvent for the liberated organic acids as presence of such a solvent generally minimizes the solvency in the resulting organic phase of inorganic salts formed in the neutralization step.

With further reference to the aforesaid series of reactions for preparation of mixtures of carboxylic acid mixtures as aforedefined, the alkali metal employed is preferably sodium, although other alkali metals such as potassium or lithium may be employed either alone or in admixture with sodium. Moreover, mixtures of sodium or potassium with other metals such as calcium can also be used. In carrying out the initial metalation reaction, it is necessary that the alkali metal be used initially in a finely divided form and, generally, as fine dispersion of the alkali metal having an average particle size of less than 50 microns is quite satisfactory for carrying out the process, with a preferred size range being five to fifteen microns. The dispersion may be conveniently prepared in an inert hydrocarbon as a separate step preliminary to the metalation reaction with the diolefin.

The metalation reaction is carried out in a reaction medium consisting essentially of an ether of a particular class of ethers that appear to possess the common property of serving as promoters of the selective dimerization reaction involved. The ether can be any aliphatic mono ether having a methoxy group, in which the ratio of the number of oxygen atoms to the number of carbon atoms is not less than 1:4. Examples include dimethyl ether, methyl ethyl ether, methyl n-propyl ether, methyl isopropyl ether, and mixtures of such methyl ethers. Certain aliphatic polyethers are also quite satisfactory. These include the acyclic and cyclic polyethers which are derived by replacing all of the hydroxyl hydrogen atoms of the appropriate polyhydric alcohol by alkyl groups. Typical examples are the ethylene glycol dialkyl ethers such as the dimethyl, methyl ethyl, diethyl, and methyl butyl ethers. The simple methyl monoethers, as dimethyl ether, and the dimethyl and diethyl ethers of ethylene glycol are preferred. The ethers employed should not contain any groups such as hydroxyl, carboxyl and the like which are distinctly reactive towards an alkali metal such as sodium. Although the ether may react in some reversible manner, it must not be subject to extensive cleavage as cleavage action destroys the ether, uses up sodium and introduces, into the reacting system, alkali metal alkoxides which, in turn, tend to induce rubberforming reactions (polymerization) rather than the desired dimerization reaction. Although the reaction medium should consist essentially of the specific ethers, other inert media can be present in limited amounts. In general, these inert media will be introduced with the sodium dispersion as the liquid in which the alkali metal is suspended and will act chiefly as diluents. The concentration of ether in the reaction mixture should at all times be maintained at a sufficient level to have a substantial promoting effect upon the desired dimerization reaction.

It is usually desirable to include in the dimerization reaction mixture at least one supplementary activating material. This material is a relatively small amount of at least one material from the class of polycyclic aromatic hydrocarbons such as naphthalene and phenanthrene, as well as the uncondensed polycyclic compounds such as diphenyl, the terphenyls, dinaphthyl, tetraphenyl ethylene, and the like. The polyphenyl compounds such as diphenyl and the terphenyls and their mixtures have been found to be particularly useful. The amount of the activating hydrocarbon to be used will vary over a range which in every case will be relatively small in comparison with the amount of butadiene undergoing reaction. Concentrations in the range of 1 to 10 weight percent based on the amount of butadiene are ordinarily quite sufficient. As to the attrition agent for use in such a reaction, its use generally effects an overall increase in reaction rate and improved utilization of the alkali metal. Materials useful therefor include inorganic solids such as alkali metal salts from the classes of halides and sulfates, for example sodium chloride, potassium chloride, sodium sulfate, potassium sulfate and the like. Also useful are metallic and non-metallic oxides which are not reactive with the alkali metal under the conditions of reaction. Thus, sand, diatomaceous earth, rutile, iron oxide, magnesia and alumina may be used. Other materials, inert to the reaction, such as graphite, zircon, and powdered coal are operable.

The reaction temperature for the metalation reaction is preferably held below 0° C. with a temperature range between —20° to —50° C. being particularly preferred.

In one typical method for carrying out the aforedescribed metalation process, the alkali metal (e. g., sodium) dispersion is initially prepared by placing an inert hydrocarbon such as isooctane in a suitable vessel with the appropriate amount of sodium. The mixture is heated in a surrounding bath or otherwise until the sodium has melted (M. P. 97.5° C.). Then a suitable high speed agitator is started and, preferably, an emulsifier consisting, for example, of ½% (based on sodium) of the dimer of linoleic acid is added. After a short period of agitation, a test sample of the dispersion shows the particle size to be in the 5 to 15 micron range. The stirring is stopped and the dispersion is allowed to cool to room temperature. This dispersion is now ready to be used in the selective dimerization. Inert liquids such as saturated dibutyl ether, normal octane, or straight run kerosenes, may be employed as suspension media for the dispersion. Any such dispersion having sufficiently finely divided alkali metal such as sodium, potassium, or lithium will suffice. Other well-known emulsifiers or dispersing substances may be used instead of the dimeric linoleic acid as the dispersing agent.

The alkali metal dispersion is added to the ether diluent which is precooled to and preferably maintained between —20° C. to —50° C. It is only necessary to employ an amount of dispersed alkali metal stoichiometrically equal to the reactant to be dimerized, although excesses of up to 10% may be desirable.

Following addition of the dispersion to the ether, the olefinic hydrocarbon is added, preferably slowly and at approximately the same ratio as that at which it reacts with the alkali metal. For maximum reaction rates of dimerization, it is desirable to maintain constant agitation of the reaction mixture.

Under the aforesaid reaction conditions, the dialkali metal derivatives are rapidly and selectively formed and, generally, are formed as slurries of the dialkali metal derivatives of the dimer of the olefin in the reaction medium. At the same time, during the course of the reaction, minor amounts of alkali metal-alkenes and -alkadienes are formed. These metallic derivatives can then be carbonated to mixtures containing the salts of unsaturated dicarboxylic acids and minor amounts of salts of unsaturated monocarboxylic acids. The carbonation may be done by subjecting the metallo derivatives to contact with gaseous carbon dioxide, by contact with solid carbon dioxide or by means of a solution of carbon dioxide in a suitable inert liquid. The temperature for carbonation should preferably be controlled below 0° C. to avoid the formation of unwanted by-products. This carbonation forms chiefly the dimetallic salts of unsaturated eliphatic dicarboxylic acids containing two more carbon atoms than the dimetallic dimers from which they are produced. Thus, in the use of butadiene, there results by this method the selective production of the salts of $C_{10}$ unsaturated aliphatic dicarboxylic acids, and in minor proportions, the salts of unsaturated monocarboxylic acids comprised chiefly of $C_5$, $C_9$, and $C_{13}$ unsaturated acids.

The carbonated mixture comprising the salts of unsaturated aliphatic dicarboxylic acids and of unsaturated monocarboxylic acids is then mixed with an excess of hot water to destroy unreacted alkali metal and to dissolve the salts of the organic acids and, when a water soluble attrition agent is used, to also dissolve the attrition agent. The resulting aqueous solution is then subjected to hydrogenation whereby the organic acid salts are converted to the corresponding saturated salts, and the free acids are then liberated by neutralization with a mineral acid. Alternatively, the salts may be subjected to neutralization to free the organic acids followed by hydrogenation of the free acids. In either case, there results from the neutralization an organic phase containing the bulk of the liberated organic acids and an aqueous phase containing, in solution, the remainder of the organic acids, water soluble salts formed in the neutralization step, and, when used, the water soluble attrition agent. Under such conditions, and although the bulk of the carboxylic acids dissolve in the resulting organic phase, a small amount (e. g., up to about 10% by weight of the total acids) normally remains in the aqueous phase. As a result of the neutralization operation carried out in an aqueous medium, and preferably in presence of a suitable liquid hydrocarbon, inorganic salt formation occurs in the liberation by the mineral acid of the carboxylic acids from their salts. Such inorganic salts, being water soluble, are dissolved in the aqueous phase which, as aforesaid, also contains in solution a small amount of carboxylic acids. Additionally, when a water soluble attrition agent has been employed in the metalation reaction, the aforesaid aqueous phase also contains the attrition agent in solution.

In accordance with this invention, the aqueous phase obtained as aforesaid is treated and utilized as described hereinafter whereby to obviate loss of the carboxylic acids therein, while avoiding undue build-up of inorganic salts in the system and obviating waste disposal problems normally attendant to the acid recovery operation. More specifically and in accordance with this invention, an aqueous phase containing dissolved organic acids and water soluble inorganic salts as aforedescribed is subjected to a treatment to convert the organic acids to water soluble salts; such a treatment may be carried out, for example, by adjustment in pH of the aqueous phase such as by addition of an alkali (e. g., caustic) to convert the organic acids to non-volatile salts. The resulting aqueous solution containing the non-volatile organic salts and water-soluble inorganic salts is treated for removal of the inorganic salts, and the aqueous solution is recycled at a defined point or points in the process from which the aqueous phase subjected to the treatment embodied herein was prepared. Thus, in the process as described hereinbefore, wherein the metalation reaction mixture is subjected to carbonation and liberation of organic acids from their salts by neutralization in an aqueous medium; or in such a process wherein the carbonated mixture is hydrogenated and acids are liberated by neutralization in an aqueous medium, the aqueous phase resulting from the neutralization treatment is, following conversion of organic acids derived therein to organic salts, and removal of inorganic salts, recycled to the process at a stage subsequent to the carbonation step but prior to the step in the recovery operation wherein the aforedescribed phase formations occur, i. e., but not subsequent to the neutralization operation. It has been found that by such a treatment of the aqueous phase and internal recycle thereof to the process as aforedescribed, the valuable carboxylic acids that are carried by the aqueous phase are maintained in the system along with avoidance of undue build-up of inorganic salts in the system and obviation of waste disposal problems such as are normally presented by an aqueous phase containing organic acids, and particularly unsaturated organic acids, which generally impart relatively high B. O. D. values to the aqueous phase.

An added feature is that, in instances wherein the acid mixture subjected to the recovery treatment has been subjected to hydrogenation, a relatively small amount of unsaturated carboxylic acids normally pass through the hydrogenation operation without being completely saturated, and by a treatment as embodied herein, such unsaturated acids which remain in the aqueous phase may be recycled in a stage in the process subsequent to the carbonation step but before the hydrogenation step whereby they are resubjected to hydrogenation.

In order to further describe the invention, several embodiments by which it may suitably be carried out are illustrated in the drawings wherein Figure I sets forth in schematic manner a flow system useful for practice of an embodiment of the invention for a process as aforedescribed in which an attrition agent is not used or, if used, is a water insoluble material and wherein Figure II illustrates a flow system adapted for practice of the invention with use of a water soluble attrition agent in the metalation reaction. It should be understood, however, that use of such embodiments is for the purpose of illustrating and not for limiting the invention.

As aforesaid, the embodiment of Figure I is adaptable for practice of the invention in continuous manner with an aqueous phase, derived from a process as aforedescribed, in which the initial metalation reaction is carried out in the absence of an attrition agent or with an attrition agent that is water-insoluble. As shown, the reaction mixture from the metalator is passed to the carbonator into which carbon dioxide is introduced. The effluent from the carbonator is treated, by suitable means such as evaporation, filtration, etc., to remove the reaction medium (e. g., dimethyl ether) and carbon dioxide, and the carbonated mixture is then passed into a hydrolyzer, the water therefrom being introduced from sources described more fully hereinafter to destroy, in the hydrolyzer, unreacted alkali metal present in the carbonator effluent passed to the hydrolyzer and to dissolve the water-soluble organic salts present in the carbonator effluent. The aqueous mixture from the hydrolyzer is filtered, especially when a water-insoluble attrition agent has been used, and the filtrate is passed to a hydrogenator wherein the aqueous solution containing the water-soluble salts is subjected to hydrogenation. From the hydrogenator, the hydrogenated product is filtered to remove solid components (i. e., hydrogenation catalyst) and to the filtrate is added an acid (e. g., sulfuric acid, hydrochloric acid, etc.), and, preferably, a suitable aromatic solvent (e. g. toluene), the acid serving to neutralize the organic acid salts in the aqueous solution and the hydrocarbon serving to minimize the solution of inorganic salts in the resulting organic phase containing the bulk of the free acids resulting from neutralization of the alkali metal salts of the carboxylic acids. In the neutralization reaction, there is formed an inorganic salt and which, in neutralization using sulfuric acid, is an alkali metal sulfate which dissolves in the aqueous phase. Thus, there is produced an organic phase containing the bulk of the desired acids in solution and an aqueous phase. In practice of such a process, it has been found that the aqueous phase contains, in addition to water-soluble inorganic salts formed in the neutralization operation, a small but nevertheless valuable concentration of organic acids, including unsaturated acids that may pass through the hydrogenation step without undergoing complete saturation, and saturated acids that dissolved in the aqueous phase rather than the hydrocarbon phase.

In accordance with this invention, the aqueous phase produced in the embodiment of Figure I is adjusted in pH to convert the dissolved organic acids to their corresponding water soluble salts. The resulting aqueous phase is then subjected to a treatment suitable for removal of the inorganic salts formed during the neutralization treatment so as to prevent build-up of such salts in the system. The aqueous phase is then recycled to the process at a point thereof following the carbonation step, and preferably to the hydrolysis step. Any water that may be removed from the system following the pH adjustment of the aqueous phase is made up by addition of make up water to the recycle aqueous phase. Alternatively, the recycle water phase may be partially passed to the hydrolyzer step and partially to a point in the process following the hydrogenation step; or, in some cases, all of the recycle water can be recycled to a point in the system subsequent to the carbonation step such as to a stage following the hydrogenation step, as indicated by the broken line in Figure I. The latter mode of operation may be employed in instances wherein the effectiveness of the hydrogenation operation is such that relatively little, if any, of the unsaturated components pass through the hydrogenator without complete saturation. In preferred operation, however, and as complete saturation is rarely effected, the recycled water and any make-up water required are introduced into the system following the carbonation step, after removal of the reaction medium (ether), and prior to the hydrogenation step whereby to insure that any acids that pass through the system without being completely saturated are resubjected to hydrogenation.

As aforesaid, the embodiment of Figure II is adapted for practice of the invention wherein the aqueous phase is derived from a process as aforedescribed in which the initial metalation reaction is carried out with a water-soluble friable attrition agent; as for example, sodium sulfate, sodium chloride, etc. As shown in Figure II, the process is similar to that described in Figure I up to and including the pH adjustment of the aqueous phase except that in this case the water phase contains in solution the water-soluble attrition agent plus water-soluble inorganic salts formed in the neutralization step. For purposes of illustration, by use of sodium sulfate as the attrition agent and use of $H_2SO_4$ for the neutralization step, the aqueous phase contains in solution the attrition agent and the water-soluble salt (e. g., alkali metal sulfate) formed in the process. In accordance with this invention, the aqueous phase from such an embodiment is subjected to adjustment in pH to convert the organic acids dissolved therein to non-volatile organic salts and then to a treatment to remove (e. g., crystallize out) the inorganic salts (attrition agent and inorganic salts formed in the process). In the use of sodium sulfate, such crystallization is preferably effected by use of a submerged combustion operation wherein the aqueous phase of adjusted pH is contacted with an open flame. The crystals of sodium sulfate that result are withdrawn, and dried. A portion of the dried sodium sulfate substantially equivalent to that derived from the attrition agent, is returned to the metalation step and the remainder (substantially equivalent to the amount of inorganic salt formed during the neutralization step) is withdrawn from the system. In a practical embodiment, utilizing such a method for recovery of the attrition agent, the aqueous phase from the attrition agent recovery step is recycled with make-up water (added to make up for steam formed and removed during the crystallization operation) to the hydrolysis step, or partly to the hydrolysis step and partly following the hydrogenation step, or wholly following the hydrogenation step, as aforedescribed.

By practice of the invention as aforedescribed, numerous advantages have been found to result. Firstly, the recovery of desired acids is improved as organic acids that would normally be removed from the system in the aqueous phase are maintained in the system by the disclosed internal recycle of the aqueous phase. Any of such acids that are unsaturated are thus resubjected to hydrogenation and resubjected to recovery in the hydrocarbon phase during the recovery step. Secondly, by use of such an internal recycle system, water requirements for carrying out the process are minimized.

Moreover, and also of particular importance, the entire aforedescribed process can be carried out without a waste disposal problem in view of maintenance in the system of organic acids that remain in the aqueous phase and which normally impart high B. O. D. values thereto.

In further illustration of the invention, a specific embodiment thereof is described hereinafter in its use with a system as set forth in Figure II and, in which process, the metalation reaction was carried out by use of a sodium dispersion prepared as follows. Unless otherwise set forth, amounts of materials utilized in the process are expressed in parts by weight.

A mixture of 200 parts of sodium and 562 parts of a $C_{12}$ alkylate was heated until the sodium melted (M. P. 97.5° C.) and the resulting mixture was subjected to vigorous agitation. 2 parts of a dimer of linoleic acid were then added whereby a sodium dispersion was produced in which the particle size of the sodium was in the range of 5 to 15 microns. The aforesaid dispersion was introduced into the metalator along with 2,000 parts of dimethyl ether (precooled to −30° C.), 600 parts of sodium sulfate, 473 parts of butadiene and 1 part of terphenyl. The metalation reaction occurred rapidly whereby there was produced a slurry comprising selectively formed disodio derivatives of octadienes and a small amount of intermediate products including sodiobutenes, sodiooctadienes and other sodio alkenes. The reaction mixture from the metalator was then passed to a carbonator into which gaseous carbon dioxide was introduced in an amount substantially in excess of that theoretically required to carbonate the sodio derivatives in the metalation reaction product. The carbonator effluent, comprising diosdium salts of $C_{10}$ unsaturated aliphatic diacids (3,7-decadienedioic acid, 7-vinyl-3-octenedioic acid and 2,5-divinyladipic acid) and a small amount of monobasic unsaturated acids ($C_5$, $C_9$, $C_{13}$, and higher), attrition agent, dimethyl ether and minor amounts of by-product hydrocarbons was then subjected to an elevated temperature (120° C.) whereby substantially complete evaporation of the dimethyl ether and excess carbon dioxide was effected. The carbonator effluent, from which the ether and carbon dioxide was removed, was then admixed in the hydrolyzer with an excess of hot water whereby unreacted sodium present in the carbonator effluent was destroyed and water soluble materials including the attrition agent (sodium sulfate) and the sodium salts of the organic acids were dissolved. The aqueous solution from the hydrolyzer was filtered to insure removal of solid materials (e. g., water-insoluble polymers that may have formed) and the aqueous filtrate was then subjected to hydrogenation using 0.5% of nickel as a hydrogenation catalyst. There was thus produced an aqueous solution of the saturated salts of the unsaturated salts subjected to hydrogenation. The aqueous solution from the hydrogenator which also contained the water-soluble attrition agent in solution was then subjected to filtration to remove solid materials (e. g., hydrogenation catalyst). To the filtrate therefrom, toluene, and sulfuric acid were added, the amount of toluene being in the ratio of two parts per part of organic acids in the filtrate and the sulfuric acid in an amount sufficient to neutralize the salts of the organic acids in the filtrate. There resulted from such treatment of the hydrogenated product (1) an organic phase containing about 90% by weight of the organic acids liberated by the neutralization treatment and (2) an aqueous phase comprising in solution the remainder of the organic acids, the attrition agent and the additional amount of sodium sulfate formed in the neutralization of the sodium salts by sulfuric acid. In accordance with this invention, the aqueous phase was adjusted to a pH of about 10 by addition of caustic to convert the organic acids in the aqueous phase to non-volatile salts. The resulting aqueous solution containing the non-volatile salts of organic acids and inorganic salts (attrition agent and the salt formed in the neutralization) was then subjected to a submerged combustion treatment whereby sodium sulfate (attrition agent plus salt formed in neutralization) was crystallized out of the aqueous phase. The thus crystallized salt was then passed to a drier and, of the resulting dry salt, an amount equivalent to that derived from the attrition agent was recycled to the metalator and the remainder was withdrawn from the system. Steam formed as a result of the submerged combustion operation was removed from the system and the aqueous phase from which the inorganic salts were removed was replenished with make-up water and recycled to the hydrolyzer step. Thus, by operation in the aforedescribed manner, the organic acids which remained in the water phase formed in the acid recovery system were recycled to the hydrolyzer and maintained in the system, thereby obviating loss of desired carboxylic acids in the described process. Other advantages that result therefrom were that, by the aforesaid internal recycle of the aqueous phase, the water requirements for the system were substantially decreased, problems attendant to waste disposal were eliminated as the necessity for disposal of a water phase containing organic acids which normally impart a high B. O. D. value was obviated, and organic acids which passed through the hydrogenation step without being completely saturated were maintained in the system and resubjected to hydrogenation and to recovery in the organic phase in the acid recovery operation.

As aforesaid, the treatment embodied herein may be utilized in processes as aforedescribed directed to production of unsaturated acids, in which case the invention may be carried out in embodiments illustrated by the figures in the drawings with elimination of the hydrogenation step.

As to the liquid hydrocarbon that may be used in the neutralization step, toluene is highly suitable but other liquid aromatic hydrocarbons may be used, such for example, as benzene, xylene, ethylbenzene, cumene, etc. In general, the liquid aromatic hydrocarbon employed is selected from aromatic hydrocarbons that selectively dissolve a major amount, as for example, up to about 90% by weight or more, of the carboxylic acids produced in a process as aforedescribed.

Moreover, and although in the specific embodiment aforedescribed, a submerged combustion operation has been utilized for removal of the inorganic salts from the aqueous phase prior to its being recycled in the described process, it should be understood that other methods may be used for inorganic salt removal, the method employed for a particular process being dependent upon the particular inorganic salt formed in the neutralization operation, the type of attrition agent employed, and the like.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. A process which comprises subjecting an olefin to reaction with a finely divided alkali metal to prepare a metalation reaction mixture comprising alkali metal derivatives of the olefin including dialkali metal derivatives of dimers of said olefin, carbonating said metalation reaction mixture to convert said alkali metal derivatives therein to salts of organic acids including the conversion of dialkali metal derivatives of dimers of the olefin to salts of dicarboxylic acids having two more carbon atoms per molecule than said dimers, neutralizing in an aqueous medium the mixture of said salts of organic acids to produce an organic phase containing in solution the major portion of the liberated organic acids and an aqueous phase containing in solution the remainder of the liberated organic acids and inorganic water-soluble salts formed in the neutralization reaction, separating the aqueous phase from the organic phase, converting the organic acids in the aqueous phase to water-soluble organic acid salts, removing sufficient water from the resulting aqueous phase to crystallize out the inorganic salts contained therein, and recycling the resulting aqueous phase containing the salts of organic acids to a stage in the aforesaid process subsequent to the carbonation step but not subsequent to the neutralization step.

2. A process which comprises subjecting an olefin to reaction with a finely divided alkali metal to prepare a metalation reaction mixture comprising alkali metal derivatives of the olefin including dialkali metal derivatives of dimers of said olefin, carbonating said metalation reaction mixture to convert said alkali metal derivatives therein to salts of organic acids including the conversion of dialkali metal derivatives of dimers of the olefin to salts of unsaturated dicarboxylic acids having two more carbon atoms per molecule than said dimers, hydrogenating said carbonated mixture to saturate the unsaturated salts, acidifying the resulting saturated salts in an aqueous medium to produce an organic phase containing in solution the major portion of the liberated organic acids and an aqueous phase containing in solution the remainder of the liberated organic acids and inorganic water soluble salts formed in the neutralization reaction, separating the aqueous phase from the organic phase, adding sufficient alkali to said aqueous phase to convert the organic acids to water soluble organic salts, removing sufficient water from the resulting aqueous phase to crystallize out inorganic salts contained therein, and recycling the resulting aqueous phase containing the salts of organic acids to a stage in the aforesaid process subsequent to the carbonation step but not subsequent to the neutralization step.

3. A process, as defined in claim 1, wherein the olefin is a conjugated diolefin, the alkali metal is sodium, and the reaction between the alkali metal and olefin is carried out in presence of an ether at a temperature below about 0° C.

4. A process, as defined in claim 3, wherein the diolefin is butadiene.

5. A process, as defined in claim 1, wherein the alkali metal is sodium, the diolefin is butadiene, the reaction between the alkali metal and olefin is carried out at a temperature below about 0 C., the carbonation is carried out by contacting the metalation reaction mixture with carbon dioxide, and the neutralization is carried out by use of a mineral acid.

6. A process, as defined in claim 1, wherein the neutralization reaction is carried out in presence of a liquid aromatic hydrocarbon solvent for the organic acids liberated by the neutralization.

7. A process, as defined in claim 6, wherein the aromatic hydrocarbon is toluene.

8. A process which comprises subjecting butadiene to reaction with finely divided sodium in the presence of a liquid ether reaction medium at a temperature below about 0° C. to prepare a metalation reaction mixture comprising sodium derivatives of butadiene including disodiooctadienes, contacting the metalation reaction mixture with carbon dioxide to carbonate the sodium derivatives to salts or organic acids including disodium salts of $C_{10}$ unsaturated aliphatic dicarboxylic acids, removing the ether reaction medium from the carbonated mixture, adding an aqueous medium to the resulting carbonated mixture to destroy unreacted sodium and dissolve water-soluble components in said carbonated mixture, neutralizing the resulting aqueous solution with a mineral acid to produce an organic acid phase containing in solution the major portion of the organic acids liberated by the neutralization reaction and an aqueous phase containing in solution the remainder of the liberated organic acids and inorganic water soluble salts formed by the neutralization reaction, separating the aqueous phase from the organic phase, adding to the aqueous phase an amount of caustic solution sufficient to convert the organic acids in the aqueous phase to water-soluble salts of said organic acids, evaporating sufficient water from the resulting aqueous phase to crystallize out inorganic salts from said aqueous phase, and recycling the resulting aqueous phase containing the dissolved salts of organic acids to a stage in the process following the carbonation step and prior to the neutralization step.

9. A process, as defined in claim 8, wherein the neutralization is carried out in presence of a liquid aromatic hydrocarbon solvent for the organic acids liberated in the neutralization reaction.

10. A process, as defined in claim 8, wherein the recycled aqueous phase is utilized as the aqueous medium for dissolving water soluble components of the carbonated mixture.

11. A process which comprises subjecting an olefin to reaction with a finely divided alkali metal in the presence of a water-soluble solid friable, inert attrition agent to provide a metalation reaction mixture comprising alkali metal derivatives of said olefin including dialkali metal derivatives of dimers of said olefin, carbonating said metalation reaction mixture to convert the alkali metal derivatives to salts of organic acids including the conversion of dialkali metal derivatives of dimers of the olefin to the salts of dicarboxylic acids having two more carbon atoms per molecule than said dimers, neutralizing in an aqueous medium the mixture comprising said salts or organic acids to produce an organic phase containing in solution the major portion of the organic acids liberated by the neutralizatin reaction and an aqueous phase containing in solution the remainder of the liberated organic acids, the water soluble attrition agent, and water soluble inorganic salts formed by the neutralization reaction, separating the aqueous phase from the organic phase, converting the organic acids dissolved in the aqueous phase to water soluble organic acid salts, removing sufficient water from the resulting aqueous phase to crystallize out the water soluble attrition agent and the water soluble inorganic salts formed in the neutralization step, and recycling the resulting aqueous phase, containing in solution the salts of the organic acids, to the aforesaid process at a stage therein following the carbonation step but not subsequent to the neutralization step.

12. A process, as defined in claim 11, wherein the attrition agent crystallized out of the aqueous phase is dried and recycled to the process for use as the attrition agent in the metalation reaction between the olefin and alkali metal.

13. A process, as defined in claim 11, wherein the solid friable attrition agent is a water soluble salt of sodium.

14. A process, as defined in claim 13, wherein the attrition agent is sodium sulfate.

15. A process which comprises subjecting an olefin to reaction with a finely divided alkali metal in presence of a solid friable, inert water soluble inorganic attrition agent to prepare a metalation reaction mixture comprising alkali metal derivatives of the olefin including dialkali metal derivatives of dimers of said olefin, carbonating said metalation reaction mixture to convert said alkali metal derivatives therein to salts of organic acids including the conversion of dialkali metal derivatives of dimers of the olefin to salts of unsaturated dicarboxylic acids having two more carbon atoms per molecule than said dimers, hydrogenating said carbonated mixture to saturate the organic acid salts, acidifying the resulting hydrogenated mixture in an aqueous medium to produce an organic phase containing in solution the major portion of the liberated organic acids and an aqueous phase containing in solution the remainder of the liberated organic acids, inorganic salts formed by the neutralization reaction and the water soluble attrition agent, separating the aqueous phase from the organic phase, adding sufficient alkali to the resulting aqueous phase to convert the organic acids in the aqueous phase to water soluble organic salts, evaporating sufficient water from the resulting aqueous phase to crystallize out the inorganic salts contained therein including the attrition agent and recycling the resulting aqueous phase containing the organic acid salts to a stage in the process following the carbonation step but not subsequent to the neutralization step.

16. A process which comprises subjecting butadiene to reaction with finely divided sodium in the presence of a liquid ether reaction medium and solid sodium sulfate as an attrition agent at a temperature of below about 0° C. to prepare a metalation reaction mixture comprising sodium derivatives of butadiene including disodiooctadienes, contacting the metalation reaction mixture with carbon dioxide to carbonate the sodium derivatives to salts of organic acids including disodium salts of $C_{10}$ unsaturated aliphatic dicarboxylic acids, removing the ether reaction medium from the carbonated mixtures, adding an aqueous medium to the resulting carbonated mixture to destroy unreacted sodium and dissolve water soluble components in said carbonated mixture, neutralizing the resulting aqueous solution with sulfuric acid to produce an organic phase containing in solution the major portion of the organic acids liberated by the neutralization reaction and an aqueous phase containing in solution the remainder of the liberated organic acids, the sodium sulfate formed by the neutralization reaction and the attrition agent, separating the aqueous phase from the organic phase, adding to the aqueous phase an amount of caustic solution sufficient to convert the organic acids in the aqueous phase to non-volatile water soluble organic salts, evaporating sufficient water from the resulting aqueous phase to precipitate the inorganic salts including the attrition agent dissolved therein, and recycling the aqueous phase containing the dissolved organic salts to a stage in the process following the carbonation step and prior to the neutralization step.

17. A process, as defined in claim 16, wherein the carbonated mixture, following removal of the ether reaction medium, is hydrogenated to saturate the sodium salts of unsaturated carboxylic acids contained in the carbonated mixture.

18. A process, as defined in claim 17, wherein the attrition agent, precipitated from the aqueous phase, containing dissolved organic salts, is dried and recycled to the metalation reaction.

References Cited in the file of this patent

UNITED STATES PATENTS

| | | |
|---|---|---|
| 2,352,461 | Walker | June 27, 1944 |
| 2,716,662 | Cohen et al. | Aug. 30, 1955 |
| 2,731,495 | Emslie | Jan. 17, 1956 |
| 2,746,991 | Miller | May 22, 1956 |
| 2,749,364 | Greenberg | June 4, 1956 |

FOREIGN PATENTS

| | | |
|---|---|---|
| 1,093,096 | France | Nov. 17, 1954 |

U. S. DEPARTMENT OF COMMERCE
PATENT OFFICE

CERTIFICATE OF CORRECTION

Patent No. 2,822,389            February 4, 1958

Raymond Wynkoop et al.

It is hereby certified that error appears in the printed specification of the above numbered patent requiring correction and that the said Letters Patent should read as corrected below.

Column 10, line 41, and column 11, line 8, for "or organic", in each occurrence, read -- of organic --; column 12, line 16, for "mixtures" read -- mixture --.

Signed and sealed this 15th day of April 1958.

(SEAL)
Attest:
KARL H. AXLINE
Attesting Officer

ROBERT C. WATSON
Commissioner of Patents